April 27, 1943.  E. G. DUDEN  2,317,847
GRAVITY FILTRATION
Filed Sept. 2, 1939  3 Sheets-Sheet 1

April 27, 1943.  E. G. DUDEN  2,317,847
GRAVITY FILTRATION
Filed Sept. 2, 1939  3 Sheets-Sheet 2

Fig. 2

INVENTOR.
Emil G. Duden.
BY Edward A. Laurence.
his ATTORNEY.

April 27, 1943.　　　E. G. DUDEN　　　2,317,847
GRAVITY FILTRATION
Filed Sept. 2, 1939　　　3 Sheets-Sheet 3
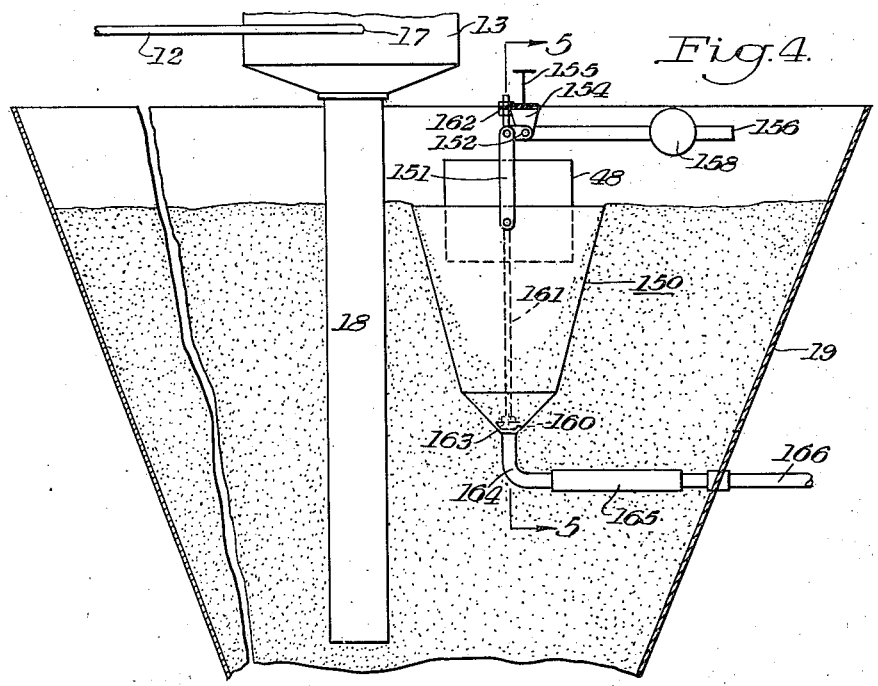
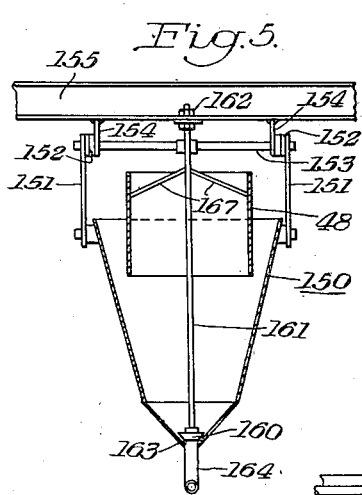
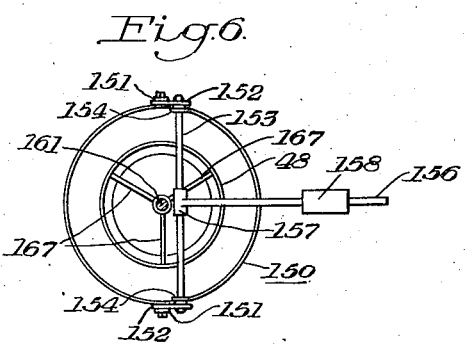
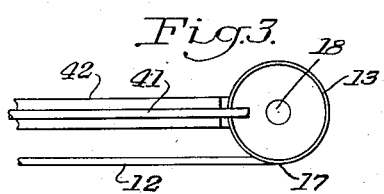
INVENTOR.
Emil G. Duden,
BY Edward A. Lawrence,
his ATTORNEY.

Patented Apr. 27, 1943

2,317,847

UNITED STATES PATENT OFFICE 2,317,847

GRAVITY FILTRATION

Emil G. Duden, Oakmont, Pa., assignor to Scaife Company, Oakmont, Pa., a corporation of Pennsylvania Application September 2, 1939, Serial No. 293,258

13 Claims. (Cl. 210—16)

This invention relates generally to water softening and purification and more particularly to gravity filtration apparatus and the method of operating the same.

The principal object of this invention is the provision of automatic means for initiating and carrying through the complete operation of the filtering process.

Another object is the provision of control means for selectively operating the filtering process automatically or manually with semi-automatic means for controlling the extent of the manual operation.

Another object is the provision of an improved battery of chemical feeders and a mixing trough for preparing the chemical reagents prior to mixing them with the main body of water.

Another object is the provision of an improved reaction apparatus in which the chemicals are mixed with the main body of water and react therewith forming a precipitant sludge which is subsequently separated from the clear water.

Another object is the provision of automatic means for blowing off the sludge collected in the reaction apparatus.

Another object is the provision of means for controlling the operation and flushing the sand filters.

Another object is the provision of means actuated by the amount of stored filtered water for controlling the operation of the filtration apparatus.

Other objects and advantages are apparent from the following description and claims.

The accompanying drawings show a practical embodiment illustrating the principles of this invention wherein:

Fig. 2 is a diagrammatic view illustrating the rest of the filtration apparatus and the electrical control circuits therefor. This figure forms a continuation of Fig. 1.

Fig. 3 is a plan view of the chemical mixing tank.

Fig. 4 shows an alternative form of sludge collector employed in the reactor apparatus shown in Fig. 1.

Fig. 5 is a sectional view of the sludge collector taken on the lines 5—5 of Fig. 4.

Fig. 6 is a plan view of the sludge collector.

Figure 1:
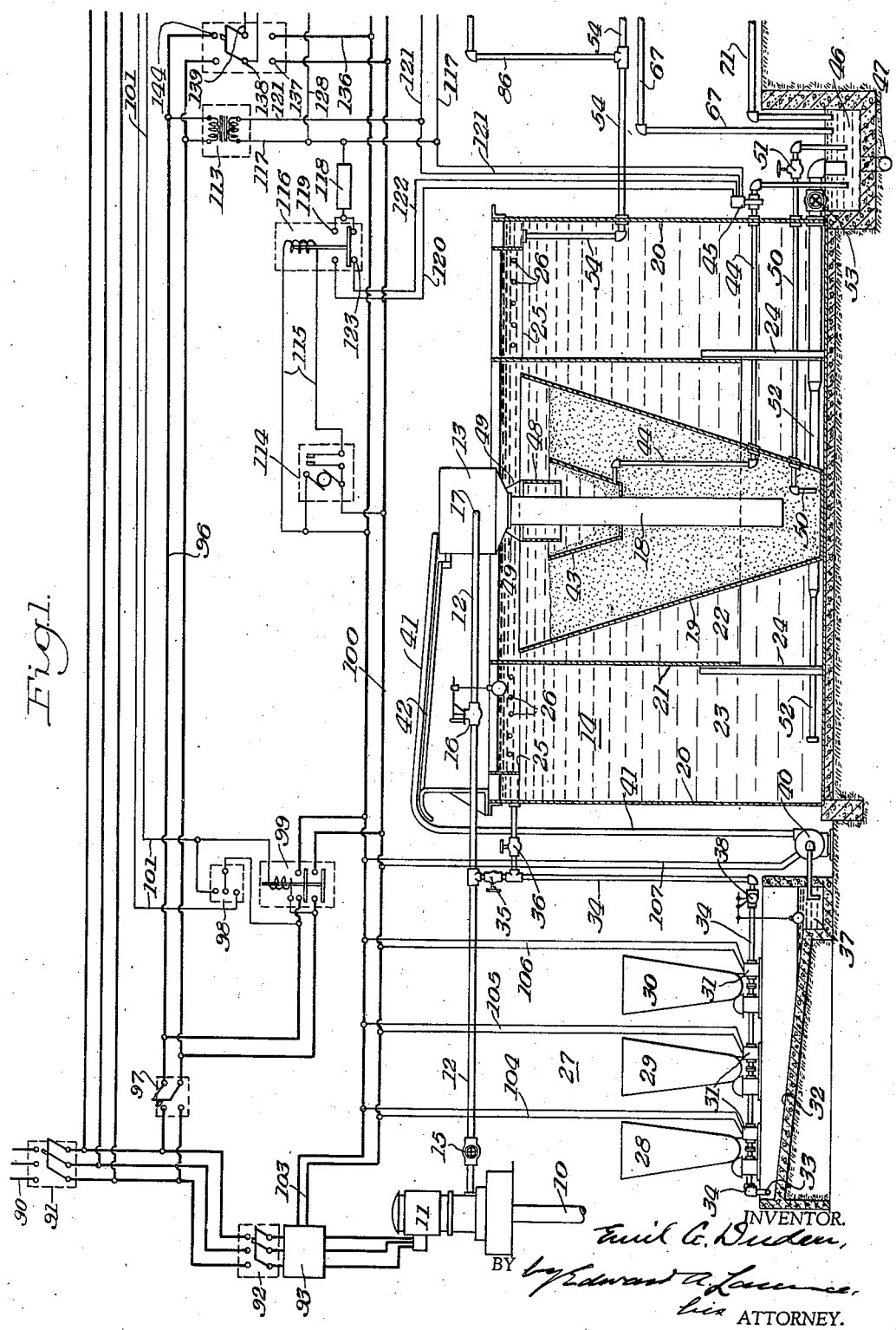
Fig. 1 is a diagrammatic view illustrating a portion of the filtration apparatus and the electrical circuits for controlling the same.

Referring to Figs. 1 and 2 of the drawings, the pipe 10 represents the source of water supply. The water to be treated is drawn through the pipe 10 by the electrically driven pump 11 and discharged through the pipe 12 to the mixing tank 13 of the reaction or treating apparatus 14. A check valve 15 and a float operated liquid level control valve 16 are provided in the discharge line 12.

The connection of the discharge pipe 12 to the mixing tank 13 is made by welding the pipe tangentially to the periphery thereof as indicated at 17 in Fig. 3. The water entering this tank under pressure is caused to swirl around the wall and the base of the tank 13 into the large downcomer tube 18.

The reactor or water treating apparatus 14 is made up of the mixing tank 13 with a downcomer 18, the inverted frusto conical shaped reactor tank 19 and the settling tank 20, the latter having an annular baffle 21 which divides the settling tank into two compartments 22 and 23 connected at their lower end.

The small circular base of the reactor tank is welded to the floor of the tank 20 forming an independent tank therein. The circular baffle 21 is supported by the legs 24 welded to the floor of the tank 20. The lower edge of the baffle 21 is preferably spaced substantially one-fourth of the height of the tank 20 from the floor of the same and the upper edge extends to the top of the tank 20 or to the roof if one is supplied therefor. It should be noted that the circular baffle 21 is uniformly spaced about the reactor tank 19 with a relatively small gap therebetween and the upper edge of the reactor tank is spaced approximately one-twelfth of the height of the tank 20 from the top thereof. Adequate space is provided in the settling tank 20 to contain a large volume of water so that an appreciable amount of water may be withdrawn therefrom without creating a disturbance.

The top of the settling tank 20 is provided with an annular water collecting flume 25 having submerged collecting orifices 26 preferably spaced on about two foot centers around the entire circumference of the flume.

The chemicals for treating the water are placed in the battery of containers shown at 27. It is preferable to employ these chemicals in their dry powdered state, and feed them in predetermined amounts according to the requirements. Any suitable chemical reagents or combination thereof may be employed. However, for the purpose of this disclosure three containers 28, 29 and 30 are shown for storing lime, soda and alum respectively. These materials are fed from their respective bins in their proper proportions by the motors 31 and dropped on to the inclined dissolving trough 32. The upper end of the dissolving trough is provided with a water spray nozzle 33 fed by the pipe 34. The water supplied to the spray pipe 34 may be obtained from the main discharge line 12 through the valve 35 or from the soft water in the flume 25 of the settling tank 20 through the valve 36.

The water is sprayed from the jets of the nozzle 33 on the chemicals, thereby dissolving them and washing them down the trough to the sump 37 at the lower end thereof. The depth of the solution in the sump of the dissolving trough is controlled by the float operated liquid level control valve 38. Thus during operation the solution is maintained at a predetermined depth and the amount of water added by the spray dissolves a proportionate amount of the chemical reagents thereby maintaining the consistency of the solution in the sump substantially constant.

The solution is pumped from the sump 37 by the motor 40 and is fed through the hose 41 to the top of the mixing tank 13. This hose is supported by the shelf-like trough 42 which prevents any of the reagents from dropping into the soft clear water of the open tank 20.

The solution being poured into the swirling water in the mixing tank becomes thoroughly mixed with the water. The water continues this circular motion to a point adjacent the bottom of the downcomer pipe 18 and by the time the water flows out of the downcomer there is no noticeable circular movement. During this time the solution is thoroughly mixed with the water and the chemicals react forming a finely divided precipitate or sludge which is carried along by the water into the reactor tank 19 and rises therein to a level determined by its density. As the sludge continues to collect in the reactor tank 19 it rises to a higher level until it finally reaches the upper open end of the sludge collector 43 which is a small annular tank secured to the downcomer. This tank is preferably of inverted frusto conical shape with its wall having the same slope as the reactor tank 19 to provide a uniformly increasing space for reaction to take place and the small end of the sludge collector tank permits the sludge to be readily removed through the blow-off pipe 44. This pipe is controlled by the electric motor operated valve 45 and empties the sludge into the waste water sump 46 where it is drained off to the sewer through the pipe 47.

A cylindrical baffle 48 suspended from the mixing tank 13 by the rods 49 surrounds the downcomer pipe and extends below the upper surface of the collector tank 43. The upper edge of this baffle member is preferably below the upper edge of the reactor tank 19.

When the sludge reaches the top of the collector tank 43 it flows over the wall and collects at the bottom where it is periodically blown off through the pipe 44 as will be explained hereinafter. Owing to the fact that the water in the sludge collector is without movement the sludge is drawn thereto. As it travels over the edge of the collector tank it slides down the inclined wall to the bottom. Since the sludge hugs the wall the water it replaces moves up through baffle 48.

Thus the sludge is always present in the reactor tank, and with the continued flow of water upwardly through the reactor tank, collects newly formed sludge which finally precipitates into the sludge collector tank. The presence of this sludge in suspension materially aids the reaction taking place in the tank 19.

It has been found that sludge of great density is not suspended high enough in the reactor tank by the flow of water therethrough to cause it to be eliminated by the sludge collector. It has also been found that the heavier sludge retained in the lower end of the reactor becomes crystalline and has a tendency to settle out in the bottom of the reactor even when water is flowing through the reactor, and since this crystalline type of sludge then is quite useless as an aid to acceleration of the chemical reactions and to the collection of new precipitates, it is desirable to remove this sludge manually by blowing it off periodically to the waste water sump 46 through pipe 50 and valve 51. It is not necessary to stop the operation of the reactor tank when this is being done.

In like manner the settling tank 20 is provided with the blow-off pipe 52 controlled by the valve 53. To insure complete coverage of the tank floor the pick-up pipes are provided with openings on four foot centers in both directions.

The clear water then flows upwardly through the sludge and over the top of the reactor tank 19, which is submerged within the settling tank 20 and then downwardly within the baffle 21 to the bottom of the tank and upwardly to the orifices in the annular flume 25.

The level of the clear water in the settling tank is maintained by the float valve 16. The water is drawn from the flume 25 through the pipe 54 to the inlet valves 55 of the two gravity sand filters 56 and 57. Float operated liquid level control valves 58 are provided on the inlet line to each filter to maintain the proper liquid level therein. These inlet lines are connected to the filters as indicated at 59.

Outlet pipes connect to the filter tanks as indicated at 60. These outlets are provided with the hand valves 61 and the float operated liquid level control valves 62 which conduct the water into the rate controller box 63. The rate controller box 63 extends into the clear water well 64 and is provided with a compartment for each filter tank and has a calibrated orifice 65 for discharging the water into the well. The water thus discharged into the compartments of the controller box is retained at a predetermined level by the valves 62 in accordance with the rate of flow through the calibrated orifices.

The filter tanks are also provided with wash water waste valves 66 which discharge the wash waste water from the tank connections 59 to the wash waste pipe 67 leading to the waste water sump 46.

In washing the filter tanks water under pressure flows through the pipe 68, the pressure wash valves 69 to the tank connections 60 and is discharged out the pipe 67. A rewash is made by permitting the water to pass from the tank 20 through the pipe 54 to rewash the filters and discharge through the rewash valves 70 and the rewash waste line 71 to the waste water drain 46.

A high pressure service motor driven pump 72 takes the water from the clear well 64 drawing it through the pipe 73, the suction valve 74 and discharging it through the line 75, the valve 76, the check valve 77 to the elevated storage tank 78 and to service as indicated at 79.

The pipe line 68 is connected to the high pressure line 75 and it is arranged to supply water under pressure to the chlorinator 80 through the electrically operated solenoid valve 81. The chlorine gas is supplied to the chlorinator from the high pressure gas cylinder 82 and after it has been mixed with the water flowing through the pipe 83 it is discharged through the hose 84 to the rate controller box, where it flows into the clear well treating the water therein.

An electrically driven stabilizing solution feeder 85, pumps a stabilizing solution from a crock contained within the cabinet, by means of a diaphragm pump, through the hose 86 to the pipe line 54 at a point intermediate the settling tank 20 and the filters.

Referring now to the electrical control apparatus on Figs. 1 and 2, 90 represents the source of electrical current which may be connected by the master switch 91. The circuit shown is for three phase electrical energy. However, if the principal motors are two phase the center wire may be eliminated. The motor driving the pump 11 is connected to the source of energy by the switch 92 through the electromagnetic motor starter 93. Likewise the motor driving the high pressure pump 72 is connected to the source of energy by the switch 94 through the electromagnetic motor starter 95.

A single phase control circuit bus 96 is connected to two wires of the three phase supply through the switch 97. A manually operated single pole single throw switch 98 is arranged when thrown up for energizing the operating coil of the master relay 99 thereby causing its armature to close the circuit energizing the bus line 100 from the bus line 96. If the switch 98 is thrown to its lower position the operating coil of the master relay 99 will be energized only when the circuit through the wires 101 is completed by the float switch 102. This switch closes this circuit only when the level of the water in the clear well 64 reaches or falls below a predetermined limit and opens the circuit when the water level reaches a "full" limit.

Thus when the switch 98 is thrown down to the automatic position the master relay 99 will be automatically energized when the water in the clear well falls to or below a predetermined level and the bus line 100 will be energized to start up the water purification system. When the bus line 100 is energized the control circuit 103 to the motor starter 93 is energized, thereby starting the pump 11. The motors 31 which feed the chemicals from the containers 28, 29 and 30 are energized through the circuits 104, 105 and 106 respectively. The float valves 62 controlling the discharge of water from the filter tanks into the controller box 63 are opened by the servo motors 125 and 126. The control circuits of these servo motors are described in detail below. The solution pump 40 is energized through the line 107. The chlorinator 80 is operated and the solenoid valve 81 is opened through the circuit 108 and lastly the stabilizing solution pump 85 is energized through the circuit 109. Thus the operation of the apparatus has been initiated automatically by the level control float valve 102 in the clear water well 64.

When the water in the clear well reaches a predetermined "low" level the float switch 110 opens the circuit 111. The altitude control switch 112 is a bellows type pressure operated control switch and is arranged to open the operating circuit of the motor starter 95 if the level of the water in the tank 78 is above a predetermined point and close the circuit at a point about two feet below the high level. Thus if the clear well tank 64 has sufficient water therein and the tank 78 has two feet of water or less than its upper limit, the control circuit for the motor starter 95 will be closed and the motor energizing the pump 72 will be operated until the first control, 110 or 112, opens the control circuit. The principal purpose of the switch 110 is to prevent the operation of the pump 72 when the level of the water in the clear well is low as there may be danger of the pump becoming air bound.

The primary of the transformer 113 is connected to the bus line 96 and the secondary is arranged to supply the low voltage control circuits. 114 represents an electrically operated time clock energized from the bus 100 and is arranged to periodically close, for a predetermined length of time, the circuit 115 through the operating coil of the relay 116. Upon being energized the relay 116 completes a circuit from the secondary of transformer 113 through wire 117, fuse 118, the front contacts 119 of relay 116, wire 120 to the electrically operated blow-off valve 45 energizing the valve to open the same and returning through wire 121 to the other side of the secondary of the transformer winding. When the predetermined period has elapsed the time clock 114 opens the circuit 115 deenergizing the operating coil of the relay 116. This relay thus energizes the line 122 through the back contacts 123 which operates the valve mechanism for closing the same, the wire 121 completing the circuit.

After this apparatus has been installed it is operated to determine the quantity and mixture of chemicals necessary to properly treat the water. At this time it is also determined how long it takes for the sludge collector 43 to become filled, how often it must be emptied and how long it takes to empty it. With these facts the frequency of operation together with the duration of the operation of the blow-off valve 45 may be determined and the time clock 114 set accordingly.

The liquid level control valves 62 are operated by floats as described above. The arms connecting the float stems with the valves are also connected to the cranks 124 of the electrically operated servo motors 125 and 126 by means of the flexible cables 127. The servo motors move their cranks through one hundred and eightly degrees each time they are energized. Thus when the crack is up as shown, the valve 62 is closed and when the servo motors 125 and 126 are again energized the cranks will move down opening the valves 62 and permitting the floats to regulate the level of the water in the controller box. These floats adjust themselves to the change in loss of head through filters and maintain a substantially constant level over the orifices 65 in the compartments of the controller box 63.

The positions of the cranks 124 of the servo motors 125 and 126 are changed by energizing these motors from the secondary of the transformer 113. The current passes through the wires 117 and 128, the fuse 129, the back contacts 130 of relay 131, wire 132 to servo motor 125, and return through wire 121 and from wire 128 through fuse 133, the back contacts 134 of relay 131, and wire 135 to the servo motor 126 and return through wire 121. The circuits just described are energized when relay 131 becomes deenergized as shown on the drawings and the servo motors 125 and 126 have thus been left in the position for closing valves 62.

When the master switch 91 and the bus circuit switch 97 are closed to energize the system and relay 99 is energized placing potential energy in the bus line 100, the operating coil of relay 131 is energized from the bus line 100 through the circuit 136, the lower contacts 137 of the double throw double pole switch 138, and circuit 139. The switch 138 connecting the operating coil of relay 131 to bus line 100 thus places the control of the servo motors 125 and 126 under the operation of relay 99 and if the switch 98 is set for automatic control the clear well low level float switch 102 thus determines the operation of these servo motors as well as the rest of the apparatus energized from the bus line 100.

If the switch 98 is set for non-automatic control then relay 131 remains energized as long as the bus switch 99 and the master switch 91 are closed.

With relay 131 energized the current passes from the secondary of transformer 113, wires 117, 128, fuse 129, front contacts 140 of relay 131, wire 141 to servo motor 125 and return through wire 121 and also from wire 128, fuse 133, front contacts 142 of relay 131, wire 143 to servo motor 126 and return through wire 121. With the relay 131 energized these circuits in turn energize the servo motors 125 and 126 to move their cranks 124 through one hundred and eighty degrees from that shown, thereby opening valves 62 and permitting their floats to regulate the flow of water from the filter tanks 56 and 57 in accordance with the setting of the orifices 65 in the controller box 63.

If it is desired to operate the servo motors without the control of relay 99 the double pole double throw switch 138 may be thrown upwardly closing contacts 144, thereby energizing the operating coil of relay 131 directly from the bus line 96. Thus the switch 138 may be operated manually for opening valves 62 to drain filters down to the level of the filter wash troughs before washing filters.

This filtration system is designed to operate at a constant rate. The water to be treated passes through the system at a constant rate and the reagents, such as lime, soda, alum, chlorine, and the stabilizing solution, are all supplied in predetermined amounts to satisfy the constant flow of water through the system.

To set the system in operation the switches 138 and 98 are thrown down and switches 97, 92 and 94 are closed. The master switch 91 is then closed to energize the whole system. An overload circuit breaker may be placed in the main circuit for protection against electrical failure of the whole apparatus.

The apparatus thus being started in motion the level of the liquid in the reagent mixing trough sump 37, in the settling tank 20, in the controller box 63, and in the clear well 64 are all automatically regulated. When the clear well reaches a predetermined "full" level the control float switch 102 shuts down the whole system automatically. However the pump 72 continues to supply the storage tank 78 and when the supply of water in the clear well 64 drops to a predetermined "low" level the float switch 102 again energizes relay 99 and the whole system is operated until the clear well is replenished to its predetermined "full" level position. The flow of water through the system is maintained at a constant rate by the filter controller box 63 and the delivery of the reagents is maintained uniform by the constant speed motors operating them.

If the switch 98 is thrown upwardly thus energizing the operating coil of relay 99 directly the system will be energized and the float control valves 62 determine the constant rate of flow of water through the system. The float valves 58 and 16 determine the water level in the filters and the settling tank respectively regardless of the automatic control circuit. If the switch 98 is permitted to remain in this position until the level of the water in the clear well is effective on the floats of the valves 62 to completely shut them off, this causes the float valves 58 and 16 to close. The main purpose for providing a straight operation of the system by closing the switch 98 to its upper position is to enable the system to be checked up and the several parts of the apparatus properly adjusted, thereby tuning up the system so that it may function properly. However the system may be continuously operated with the relay 99 directly energized by controlling the operation of the motors operating the pumps 11 and 40 by means of the float valve 16 and controlling the operation of the reagent feeder motors 31 by the float valve 38. The controls for these motors may be of any well known type operable by the mechanical movement of the float valves 16 and 38. In the structure as shown the float valve 16 is preferably adjusted to tune the discharge of the pump 11 with the setting of the uniform flow rate set by the controller box 63.

It is preferable to provide a positive displacement metering pump having an adjustable by-pass orifice for the pump 11. With this character of pump a metered quantity of water will be delivered to the mixing tank 13 under a predetermined pressure. After the system has been installed and tuned up the pressure differential on the float valve 16 will be materially reduced.

The reagent feeders shown and described are designed to feed the chemicals in a dry powdered state, however, they may be supplied in solution form and introduced together or independently into the mixing tank 13 without altering the scope of this invention. The number and kind of chemical reagents depend largely upon the analysis of the water to be treated and the purpose for which it is used.

Referring now to Figs. 4, 5 and 6, 150 represents a mechanically automatic sludge collector or bucket and arranged to be mounted within the reaction chamber 19 which is disposed within the settling tank 20 as shown in Fig. 1. The structural character of this modified sludge collector prevents it from being disposed around the downcomer pipe 18. It is thus preferably positioned closely adjacent to the downcomer pipe 18 with sufficient clearance to permit movement of the sludge collector.

The sludge collector bucket 150 is pivotally supported by the links 151 the upper ends of which are pivotally attached to the outer ends of the short arms 152 secured to the ends of the rod 153. The rod 153 is journaled in the spaced hanger bearings 154 which are welded to the structural beam 155 that extends across the top of the settling tank 20. One end of the scale beam 156 is secured to the center of the rod 153 as indicated at 157. 158 represents a poise weight which is adjustable along the beam 156.

A valve plug 160 is secured to the end of the valve stem rod 161 which in turn is fastened to the structural beam 155 as indicated at 162. This valve is arranged to rest on the valve seat 163 in the conical bottom of the sludge receiver 150 and close the blow-off pipe 164 when the poise weight over-balances the bucket 150 and the weight of the sludge contained therein.

The blow-off pipe 164 is connected by the flexible piece of hose 165 to the pipe 166 which leads to the waste drain sump 46. The baffle 48 may be secured to the valve stem rod 161 by the hangers 167.

The sludge in the reactor tank 19 is drawn to the dead or non-moving water zone in the bucket 150 and it slides down the sides of the bucket to the conically shaped bottom, as indicated on the drawing, pushing the water up through the baffle 48. When the weight of the bucket and the sludge therein exceeds the effective weight of the poise 158 the bucket drops, thus carrying the valve seat 163 away from the valve 160 and permitting the head of water above the bucket to force the sludge out through the pipe 164 and the flexible connection 165 to the pipe 166 and thus to the waste drain sump. When the sludge bucket has thus been emptied sufficiently the weight of the poise raises the bucket and closes the valve 160 until a sufficient amount of sludge has again collected, causing the bucket to operate in the same manner.

In this manner the sludge is automatically removed from the reaction tank without the necessity of the electrically operated blow-off valve 45, relay 116 and the time clock 114. Otherwise the system may be the same as that shown in Figs. 1 and 2.

When softening water by a treatment with lime and soda the soluble compounds of calcium and magnesium are changed to an insoluble form. Also when treatment of a colored or turbid water supply consists of an application of an alkaline reagent and a coagulant, a gelatinous mass or floc is formed. The precipitates formed in softening as well as the floc produced by the coagulant are very light and fluffy and usually require from three to four hours to settle out before the treated water is sufficiently clear to be applied to the sand filters.

When precipitate or sludge from previous treatment is mixed with the new finely divided precipitate the chemical reactions are accelerated and the new finely divided precipitate, weighted by the sludge of previous precipitation, settles more rapidly and perfectly.

The acceleration in chemical reactions and settling obtainable, when sludge from previous precipitation is used, is disclosed in the United States Letters Patent issued to John C. W. Greth No. 786,559.

The agitation obtained by the hydraulic mixing as disclosed in this application is of a gentle character, yet producing a thorough dispersement of the reagents through the water treated, thereby encouraging the formation of fine precipitates and their collection into larger masses. On their passage through the sludge bed, the new precipitates are gathered up by the old sludge bed and become a part of the suspended sludge bed. During its passage through the suspended sludge bed, which is of about thirty minutes duration, the chemical reactions have been completed, and the water leaving the top of reactor tank is practically clear.

As the quantity of sludge, retained in the reactor, increases with the length of operation, means must be provided to get rid of the surplus sludge to prevent its passage into the settling tank.

Two methods of elimination of excess sludge are shown and described above. In both methods the excess sludge flows continuously into the sludge collector. In the first method the sludge is blown down by motor operated valve, controlled by time clock. In the other method the sludge is blown off by lowering of the sludge collector, due to the increased weight of the trapped sludge, thereby opening the blow-off valve; after the sludge has been blown off the collector returns to its initial position and thereby closes the blow-off valve. These methods represent material advancement in the art of water purification.

I claim:

1. A water purification apparatus comprising an inverted frusto-conical reaction tank closed at the bottom to contain the water to be treated and open at the top, a pipe leading into the reaction tank and having an opening adjacent the bottom of the reaction tank to hydraulically direct a flow of predetermined mixture of raw water and reagents toward the bottom of the reaction tank where it is distributed uniformly and flows upwardly through the reaction tank and overflows the top thereof, an open top sludge collector positioned in the reaction tank at a level intermediate the top level of the water therein and at the opening of the pipe, said sludge collector being disposed to receive sludge from the reaction tank along lines radial of the latter and in a horizontal plane, a second pipe connected to the bottom of the sludge collector to discharge the sludge to the outside of the apparatus to prevent its return to the upward flow of water in the reaction tank, and means to withdraw water from the top of the reaction tank.

2. A water purification apparatus comprising an inverted frusto-conical reaction tank closed at the bottom to contain the water to be treated and opened at the top, a pipe leading into the reaction tank and having an opening adjacent the bottom of the reaction tank to hydraulically direct a flow of predetermined mixture of raw water and reagents toward the bottom of the reaction tank where it is distributed uniformly and flows upwardly through the reaction tank and overflows the top thereof, an open top sludge collector positioned in the reaction tank at a level intermediate the top level of the water therein and the opening of the pipe, said sludge collector being disposed to receive sludge from the reaction tank along lines radial of the latter and in a horizontal plane, tubular baffle means in the sludge collector to prevent sludge being withdrawn from the sludge collector by the circulating water, a second pipe connected to the bottom of the sludge collector to discharge the sludge to the outside of the apparatus to prevent its return to the upward flow of water in the reaction tank, and means to withdraw water from the top of the reaction tank.

3. A water purification apparatus comprising an inverted frusto-conical reaction tank closed at the bottom to contain the water to be treated and open at the top, a pipe leading into the reaction tank and having an opening adjacent the bottom of the reaction tank to hydraulically direct a flow of predetermined mixture of raw water and reagents toward the bottom of the reaction tank where it is distributed uniformly and flows upwardly through the reaction tank and overflows the top thereof, an open top sludge collector positioned in the reaction tank at a level intermediate the top level of the water therein and the opening of the pipe, said sludge collector being disposed to receive sludge from the reaction tank along lines radial of the latter and in a horizontal plane, tubular baffle means immersed in the water in the reaction tank and depending within the sludge collector to aid in the separation of the sludge from the water, a second pipe connected to the bottom of the sludge collector to discharge the sludge to the outside of the apparatus to prevent its return to the upward flow of water in the reaction tank, and means to withdraw water from the top of the reaction tank.

4. A water purification apparatus comprising an inverted frusto-conical reaction tank closed at the bottom to contain the water to be treated, a pipe leading into the reaction tank and having an opening centrally disposed adjacent the bottom of the reaction tank to hydraulically direct a flow of predetermined mixture of raw water and reagents toward the bottom of the reaction tank where it is distributed uniformly and flows upwardly through the reaction tank and is discharged at the top thereof, an open top sludge collector positioned in the reaction tank at a level intermediate the top level of the water therein and the opening of the pipe, said sludge collector being disposed to receive sludge from the reaction tank along lines radial of the latter and in a horizontal plane, a second pipe connected to the bottom of the sludge collector to discharge the sludge to the outside of the apparatus to prevent its return to the upward flow of water in the reaction tank, means actuated by the weight of the sludge in the collector for discharging sludge therefrom through the second pipe, and means to withdraw water from the top of the reaction tank.

5. In water softening apparatus, the combination of an annular settling tank, a reaction tank submerged within the settling tank and comprising an inverted frusto-conical shell open at the top and closed at the bottom thereof, means for introducing a mixture of raw water and reagent material to the reaction tank adjacent the bottom thereof, a cylindrical baffle member in the settling tank surrounding the reaction tank and having its lower edge spaced from the bottom of the settling tank and its upper edge extending to the top thereof, and means for withdrawing water from adjacent the top of the settling tank exteriorly of said cylindrical baffle member.

6. In water softening apparatus, the combination of an annular settling tank, a reaction tank submerged within the settling tank and comprising an inverted frusto-conical shell open at the top and closed at the bottom thereof, a cylindrical baffle member in the settling tank surrounding the reaction tank and having its lower edge spaced from the bottom of the settling tank and its upper edge extending to the top thereof, means for withdrawing water from adjacent the top of the settling tank exteriorly of said cylindrical baffle member, a mixing tank disposed above the reaction tank and having a downcomer pipe connecting therebetween for delivering the water to be treated and the reagent solution mixed therewith to the lower part of the reaction tank, a sludge collector submerged within the reaction tank, and a vertically disposed cylindrical sludge baffle having its lower edge extending into the sludge collector and its upper edge extending to a plane adjacent the upper edge of the reactor tank and means for blowing off the sludge from the bottom of the sludge collector, the reactor tank and the settling tank.

7. A sludge collector, for use in an upwardly open reaction tank submerged within a settling tank of a water purification apparatus, comprising an upwardly open sludge collector tank, a tubular baffle member having its lower edge submerged within the sludge collector tank and its upper edge extending thereabove to permit the water in the sludge collector tank to flow upwardly through the baffle member when displaced by the sludge flowing into the sludge collector tank without disturbing the sludge in the apparatus, and a pipe connected to the bottom of the sludge collector tank for discharging the sludge to the outside of the apparatus.

8. A water softening apparatus consisting of a settling tank having inlet and outlet connections, an upwardly open reaction tank in the settling tank submerged below the normal water level of the settling tank, the reaction tank having an inlet opening adjacent the bottom thereof, and an upwardly open sludge collector tank positioned in the reaction tank below the top of the latter and above said inlet opening for separating the sludge from the water as it flows up out of the reaction tank into the settling tank, and a pipe extending through the reaction tank for conveying the sludge from the sludge collector tank to without the system to prevent the return of the sludge to the upward flowing water in the reaction tank.

9. The method of producing a supply of clear water from a reaction tank in a water purification system which comprises hydraulically inducing a continuous unidirectional pacific flow of a predetermined mixture consisting of raw water and reagent material upwardly within the tank to establish and hold in quiet suspension a dense bed of sludge within the tank to absorb the sludge particles from the flowing mixture of water and reagent material, blanketing an area submerged within the tank from the upward flow permitting the sludge to move laterally thereto from the bed without disturbing the bed or the continued upward flow, discharging sludge from the blanketed area to maintain the bed at a predetermined elevation within the tank, and withdrawing clear water from the tank at a higher elevation.

10. The method of producing a supply of clear water from a reaction tank in a water purification system which comprises hydraulically inducing a continuous unidirectional pacific flow of a predetermined mixture consisting of raw water and reagent material upwardly within the tank to establish and hold in quiet suspension a dense bed of sludge within the tank to absorb the sludge particles from the flowing mixture of water and reagent material, blanketing an area submerged within the tank from the upward flow permitting the sludge to move laterally thereto from the bed without disturbing the bed or the continued upward flow, displacing the water upwardly from the submerged area by the movement of sludge thereto, discharging sludge from the blanketed area to maintain the bed at a predetermined elevation within the tank, and withdrawing clear water from the tank at a higher elevation.

11. In a water purifying system the combination of a reactor tank, means for delivering raw water and reagents to the reactor tank adjacent the bottom thereof, the clear water overflowing the top of the reactor tank, an open top sludge collector mounted within the reactor tank sufficiently below the top of the latter to permit the sludge to flow into the top thereof and separate from the clear water flowing out the top of the reactor tank, a baffle member supported within the sludge collector and extending thereabove to permit the water to circulate back to the reactor tank when displaced by the collection of sludge, and means for discharging the sludge from the sludge collector.

12. In water softening apparatus, the combination of a settling tank, a reactor tank mounted within the settling tank and at its top communicating therewith below the water level in the settling tank, a baffle member surrounding the reactor tank and extending from above the water level in the settling tank but spaced from the floor thereof, means for delivering a mixture of raw water and reagent material to adjacent the lower portion of the reactor tank, and means for withdrawing the clear water from the top of the settling tank outside said baffle member.

13. A sludge collector for use in an upwardly open reaction tank submerged within a settling tank of a water softening apparatus comprising an inverted frusto-conically shaped shell closed at the lower end thereof, a cylindrical baffle member having its lower edge concentrically positioned within the shell and its upper edge extending thereabove but immersed to permit the water displaced by the deposit of sludge to travel upwardly therethrough, and a pipe connected to the bottom of the shell for discharging the sludge therefrom.

EMIL G. DUDEN.